United States Patent [19]
Kasugai

[11] Patent Number: 5,390,366
[45] Date of Patent: Feb. 14, 1995

[54] MOBILE COMMUNICATION SYSTEM

[75] Inventor: Teruaki Kasugai, Tokyo, Japan

[73] Assignee: NEC Corporation, Japan

[21] Appl. No.: 841,708

[22] Filed: Feb. 26, 1992

[30] Foreign Application Priority Data

Mar. 12, 1991 [JP] Japan .................................. 3-072479
Mar. 12, 1991 [JP] Japan .................................. 3-072481

[51] Int. Cl.6 .............................................. H04B 1/00
[52] U.S. Cl. .................................. 455/56.1; 455/58.2; 455/62; 370/95.3
[58] Field of Search .................... 455/33.1, 33.4, 53.1, 455/54.1, 56.1, 58.2, 62, 34.1, 34.2; 370/95.1, 95.3

[56] References Cited

U.S. PATENT DOCUMENTS

| | | | |
|---|---|---|---|
| 3,764,915 | 10/1973 | Cox et al. | 455/34.1 |
| 4,127,744 | 11/1978 | Yoshikawa et al. | 455/34.2 |
| 4,144,412 | 3/1979 | Ito et al. | 455/33.4 |
| 4,166,927 | 9/1979 | Hamaoki | 455/34.2 |
| 4,414,661 | 11/1983 | Karlstrom | 455/33.1 |
| 5,034,993 | 7/1991 | Sasuta et al. | 455/34.1 |
| 5,109,527 | 4/1992 | Akerberg | 370/95.3 |
| 5,212,822 | 5/1993 | Fukumine et al. | 455/56.1 |
| 5,241,686 | 8/1993 | Charbonnier | 455/56.1 |

Primary Examiner—Curtis Kuntz
Assistant Examiner—Andrew Faile
Attorney, Agent, or Firm—Laff, Whitesel, Conte & Saret

[57] ABSTRACT

A mobile communication system comprises a plurality of base stations to which a single control channel and a plurality of communication channels are allocated, a single control station connected to this plurality of base stations and mobile stations each disposed within an area of the plurality of base stations which is allowed to communicate with the base station through the single control channel and the plurality of communication channels. The control channel and the plurality of communication channels are shared by the plurality of base stations.

3 Claims, 7 Drawing Sheets

MOBILE COMMUNICATION SYSTEM

FIELD OF THE INVENTION

The present invention relates to a mobile communication system comprising a plurality of base stations to which a single control channel and a plurality of communication channels are assigned, a single control station interconnected with this plurality of base stations and mobile stations, each mobile station being disposed within the area of the plurality of base stations for communicating with the base stations through a single control channel and a plurality of communication channels.

BACKGROUND OF THE INVENTION

Conventionally, mobile communication systems of this type have been made up of a control channel and a plurality of communication channels which differ for each base station. The operations initiated by sending out idle signals from the base stations to the mobile stations and continuing until switching from the control channel to the communication channel are as follows:

Each base station sequentially sends an idle signal to the mobile stations by a previously assigned system time slot of the control channel. Based on the radio field intensity of the idle signal from each base station, the mobile station selects a base station whose idle signal exhibits the strongest radio field intensity and sends a registration signal on the control channel that is synchronized with the corresponding idle signal. In response to this registration signal, said base station sends back at the previously assigned time slot of the control channel a signal indicating that the registration has been completed.

The mobile station sends a call signal on the control channel synchronized with the idle signal of the registered base station. The base station raises a vacant communication channel based on the call signal and sends back its acknowledgement signal in the previously assigned system time slot of the control channel, and the mobile station, based on the acknowledgement signal, switches from the control channel to the above-described raised communication channel.

In the conventional mobile communication system described above, a plurality of distinct communication channels is provided for each base station in addition to the control channel, and the number of the communication channels for each base station is matched by the number of calling peaks occurring within the area of that base station. Such a system requires a large number of communication channels for the entire network of base stations, and this results in a reduced level of working efficiency of the communication channels.

SUMMARY OF THE INVENTION

An object of the present invention is to provide a mobile communication system which allows the control channel and the communication channels to be effectively utilized. Another object of the present invention is to provide a mobile communication system which loses fewer calls when calls are concentrated in the area of a single base station.

The primary object of the present invention can be achieved by having the plurality of base stations share the control channel and plurality of communication channels. The second object of the present invention can be achieved by providing the control station with a means for determining a time slot of the control channel to be subsequently allocated to each base station in accordance with the ratio of the number of mobile stations registered to each base station at a given time.

The above and other objects, features, and advantages of the present invention will become apparent from the following description by referring to the accompanying drawings which illustrate an example of a preferred embodiment of the present invention.

DETAILED DESCRIPTION OF THE PREFERRED EMBODIMENTS

Figure 1:
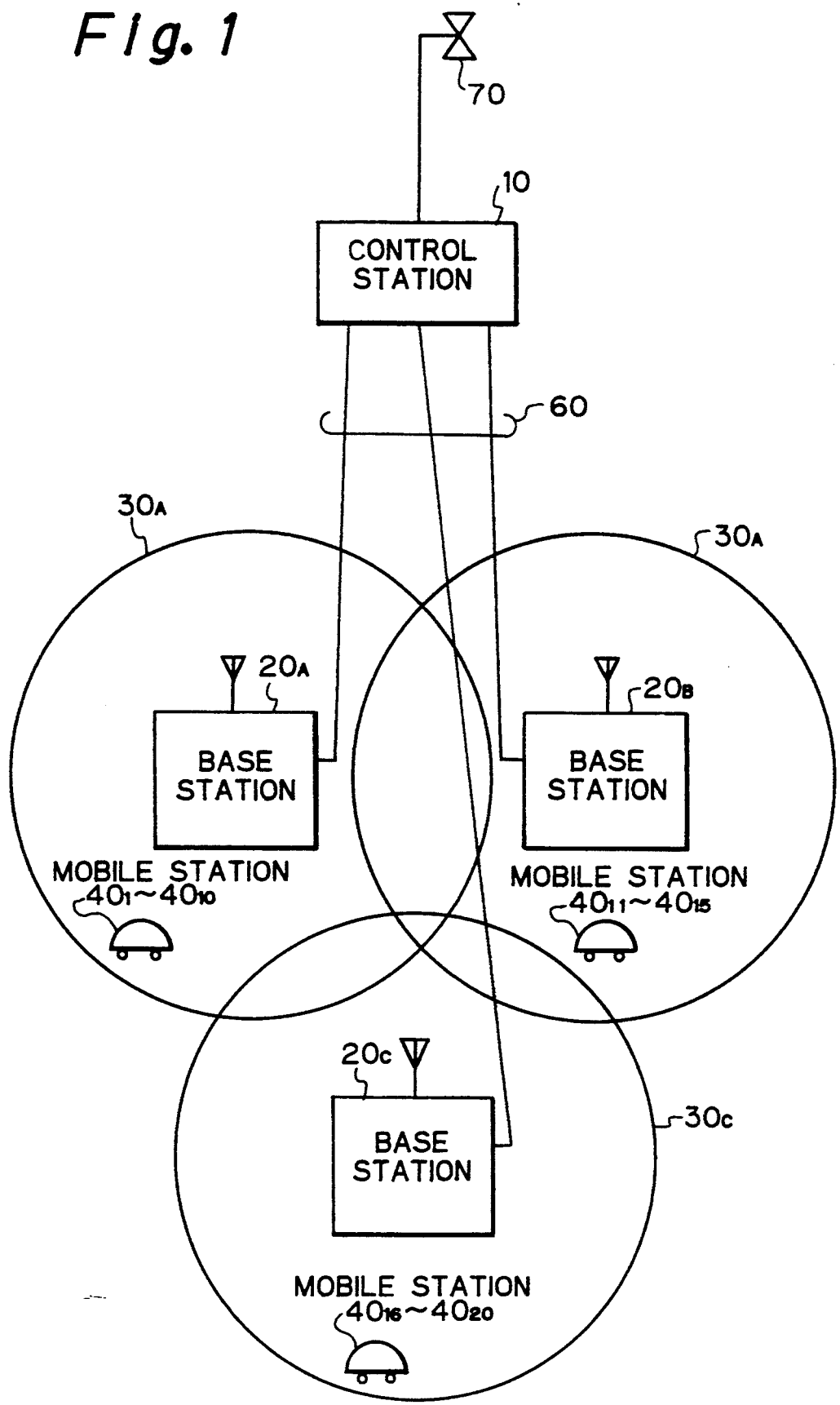
FIG. 1 is a view illustrating an arrangement of a specific embodiment of the mobile communication system according to the present invention.
Figure 2:
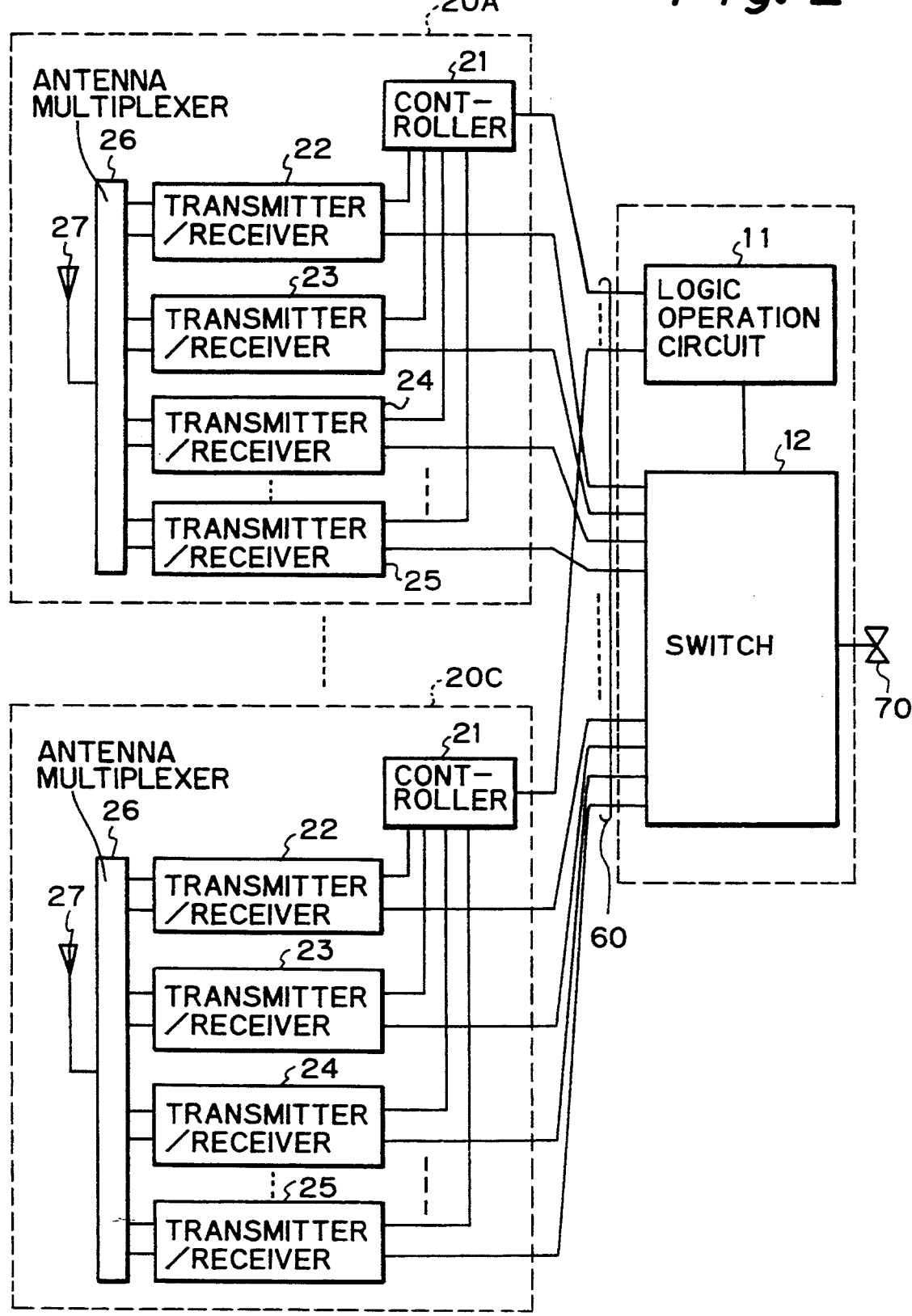
FIG. 2 is a block diagram illustrating the arrangement of a control station 10 and base stations 20A, 20B and 20C shown in FIG. 1.

Referring to FIG. 1, a mobile communication system according to the present invention comprises three base stations 20A, 20B and 20C utilizing a single control channel and N ($N \geq 2$) communication channels, a control station 10 connected to these base stations 20A, 20B and 20C by a communication line 60 and mobile stations $40_1$ through $40_{20}$ which may communicate with base stations 20A through 20C through a single control channel and a plurality of communication channels. Referring to FIG. 2, base stations 20A, 20B and 20C are each assigned a transmitter/receiver 22 of the control channel, a transmitter/receiver 23 of the first communication channel, a transmitter/receiver 24 of the second communication channel, ..., a transmitter/receiver 25 of the N-th communication channel, an antenna multiplexer 26, an antenna 27 and a controller 21. Transmitter/receiver 22 of the control channel transmits and receives various control signals via antenna multiplexer 26 and antenna 27 between mobile stations $40_1$ through $40_{20}$. That is, transmitter/receiver 22 of the control channel sequentially transmits an idle signal to mobile stations $40_1$ through $40_{20}$ in the assigned time slot of the control channel, and receives the registration signal transmitted from mobile stations $40_1$ through $40_{20}$ via the control channel synchronized with the idle signal, and sends back a signal indicating the completion of the registration in the assigned time slot of the control channel. On the other hand, transmitter/receiver 22 of the control channel receives the call signal in the assigned time slot of the control channel transmitted by mobile stations $40_1$ through $40_{20}$. When raising one of the vacant communication channel, controller 21 sends back the acknowledgement signal in the assigned time slot of the control signal via transmitter/receiver 22 of the control channel to the mobile station which sent a registration signal. Transmitter/receiver 22 of the control channel has the same frequency for all of base stations 20A, 20B and 20C. Transmitter/receiver 23 of the first communication channel, transmitter/receiver 24 of the second communication channel, ..., and transmitter/receiver 25 of the N-th communication channel each have the same frequency for each channel for all of base stations 20A, 20B and 20C. Controller 21 controls transmitter/receiver 22 of the control channel as well as transmitter/receiver (23 to 25) of each of the communication channels from the first communication channel through the N-th communication channel in accordance with instructions from a logic operation circuit 11 within the control station 10 when monitoring information (information as to whether a communication channel is turned ON or OFF, trouble information and the like) is sent to logic operation circuit 11 from transmitter/receiver 22 of the control channel and from transmitter/receiver (23-25) of each of the communication channels from the first through the N-th communication channel.

Referring to FIG. 2, control station 10 is connected to base stations 20A through 20C by a communication line 60, and includes a switch 12 for connecting each of base stations 20A through 20C with a telephone set 70 and a logic operation circuit 11 for controlling switch 12 and each of base stations 20A through 20C.

Figure 3:
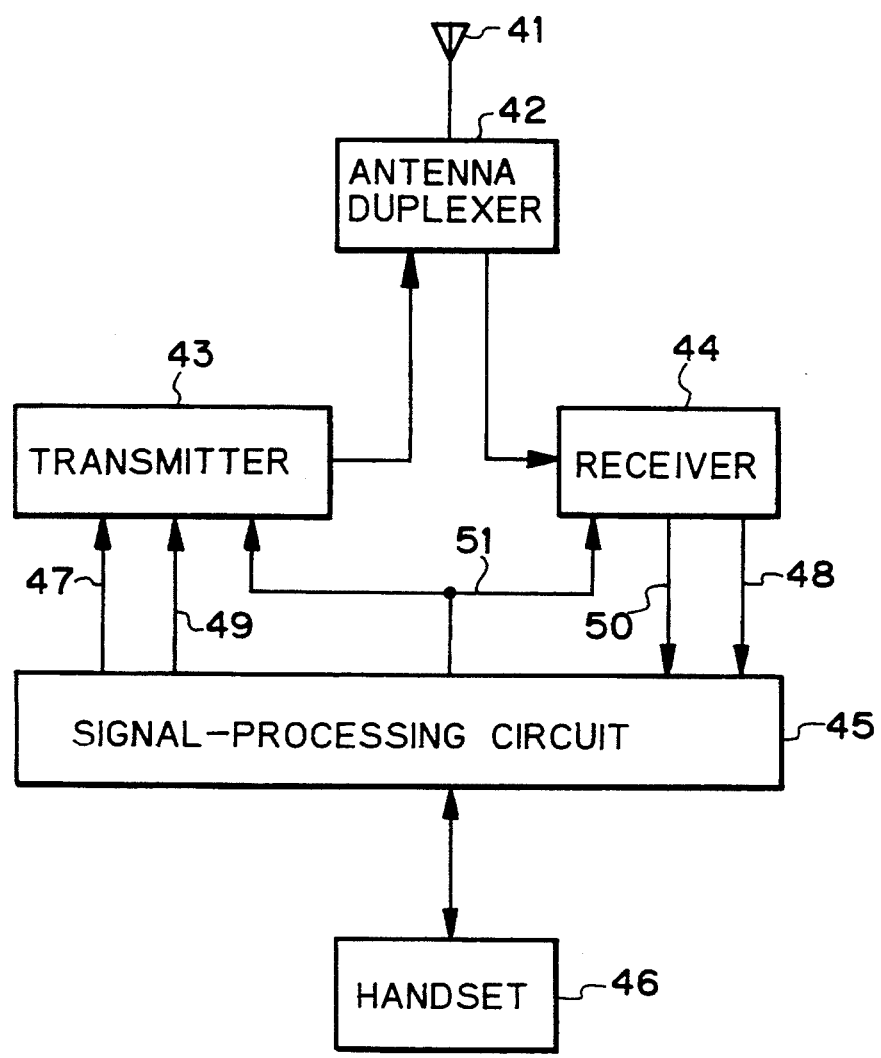
FIG. 3 is a block diagram illustrating an arrangement of mobile stations $40_1$ through $40_{20}$ in FIG. 1.

Referring to FIG. 3, mobile stations $40_1$ through $40_{20}$ each includes an antenna 41, an antenna duplexer 42, a transmitter 43, a receiver 44, a handset 46 and a signal-processing circuit 45 connected to handset 46 for controlling transmitter 43 and receiver 44.

Antenna 41 is connected to transmitter 43 and receiver 44 by antenna duplexer 42. Transmitter 43 and receiver 44 comprises a synthesizer and are each set to a necessary frequency through a channel specifying line 51 by the signal-processing circuit 45. Handset 46 is connected to transmitter 43 through signal-processing circuit 45 by a modulated signal line 47 and is connected to receiver 44 by a demodulated signal line 48. Signal-processing circuit 46 raises transmitter 43 by a transmitter activating line 49, as necessary, while monitoring voltage entering the receiver 44 by a radio field intensity information line 50. Upon receipt of idle signals from base stations 20A through 20C via antenna 41 and antenna duplexer 42, receiver 44 sends information regarding the radio field intensity of the idle signals to signal-processing circuit 45 by radio field intensity information line 50. Based on the information regarding the radio field strength of the idle signals, signal-processing circuit 45 selects the base station whose idle signal exhibits the strongest radio field intensity to activate transmitter 43 by transmitter-activating line 49. Transmitter 43 sends back a registration signal via the control channel synchronized with the idle signal of the selected base station. In addition, transmitter 43 sends a call signal in the assigned time slot of the control channel by the control of signal-processing circuit 45. When receiver 44 receives the acknowledgement signal from base stations 20A through 20C, signal-processing circuit 45 switches the channel of the mobile station from the control channel to the communication channel raised by base station 20A by tuning the control of transmitter 43 and receiver 44 to that communication channel.

The operation of a mobile communication system having such an arrangement will now be described.

Figure 4:
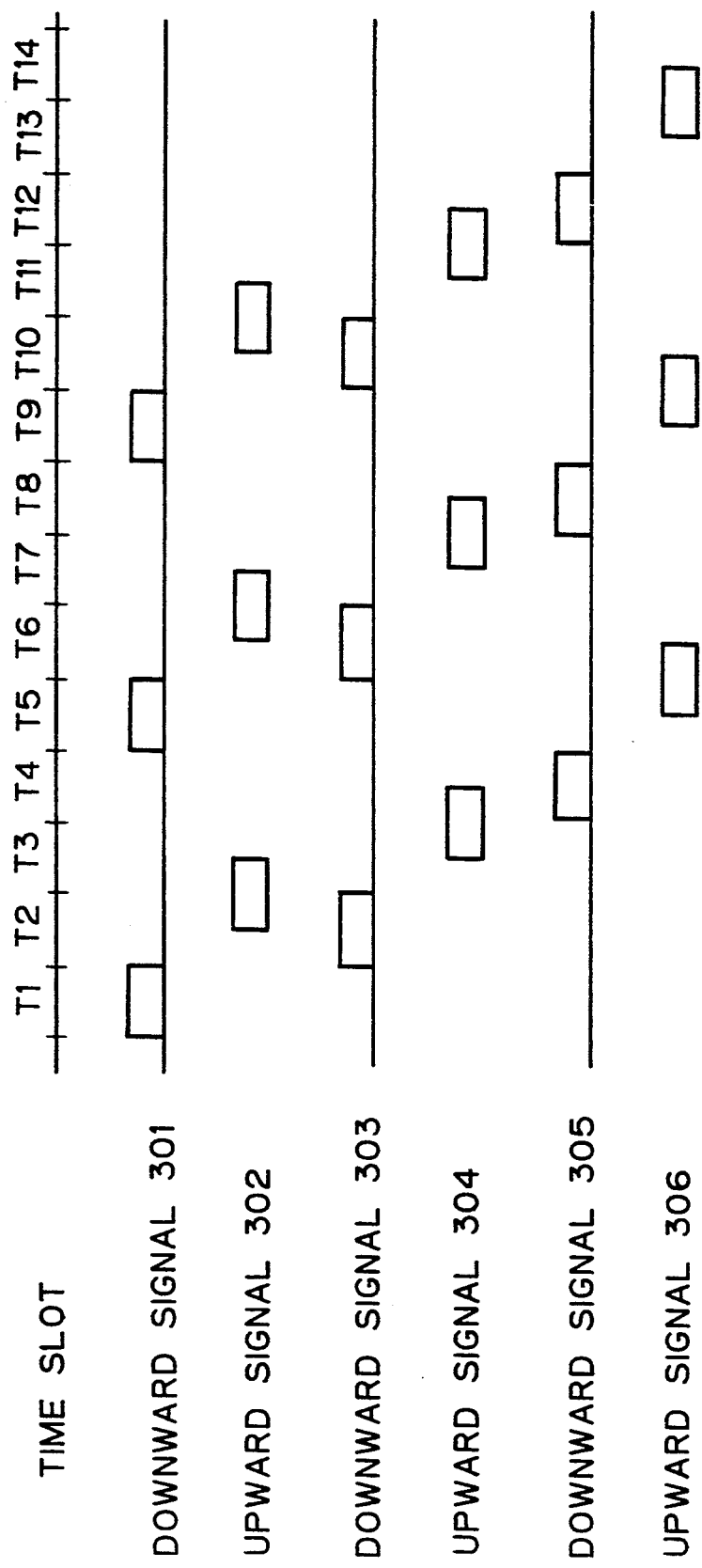
FIG. 4 is a view illustrating how the time slot of the control channel is assigned to each of base stations 20A, 20B and 20C in the initial state.

As shown in FIG. 4, in the initial state, time slots T1, T5 and T9 of the control channel are allocated to base station 20A, time slots T2, T6 and T10 are allocated to base station 20B, and time slots T4, T8 and T12 are allocated to base station 20C. Base station 20A sends a downward signal 301 to the mobile station in transmitter/receiver 22 of the control channel in accordance with instructions from controller 21 along with time slots T1, T5 and T9. Upon receipt of this downward signal 301, the mobile station sends a signal 302 delayed by half of one time slot. Similarly, base station 20B sends a downward signal 303 in time slots T2, T6 and T10 and, upon receipt of this downward signal 303, the mobile station sends an upward signal 304. Base station 20C sends a downward signal 305 in time slots T4, T8 and T12 and, upon receipt of this downward signal 305, the mobile station sends an upward signal 306.

Figure 5:
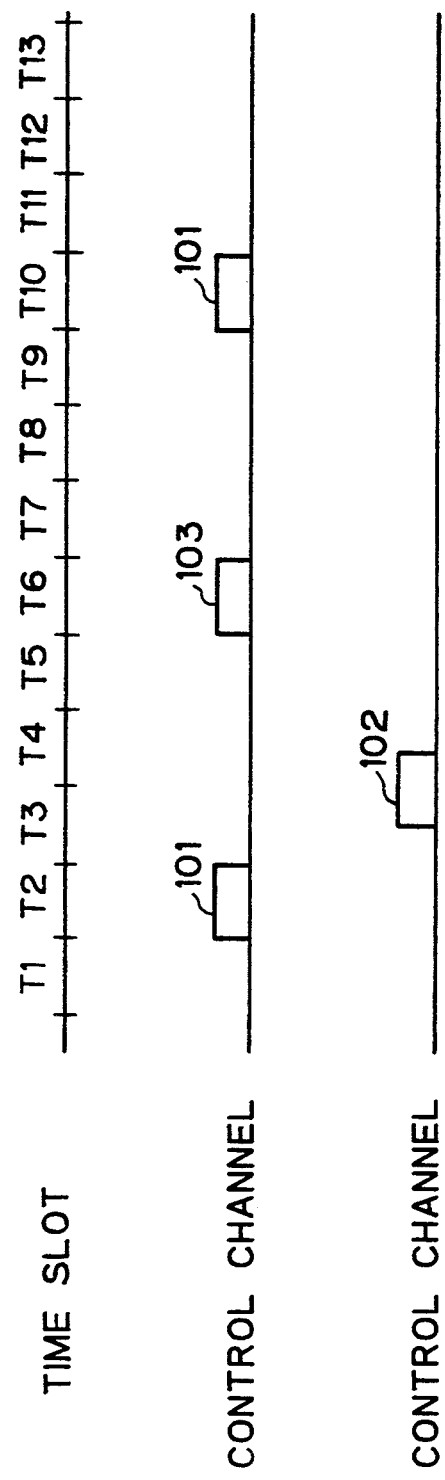
FIG. 5 is a timing chart for each signal when a mobile station is registered.
Figure 6:
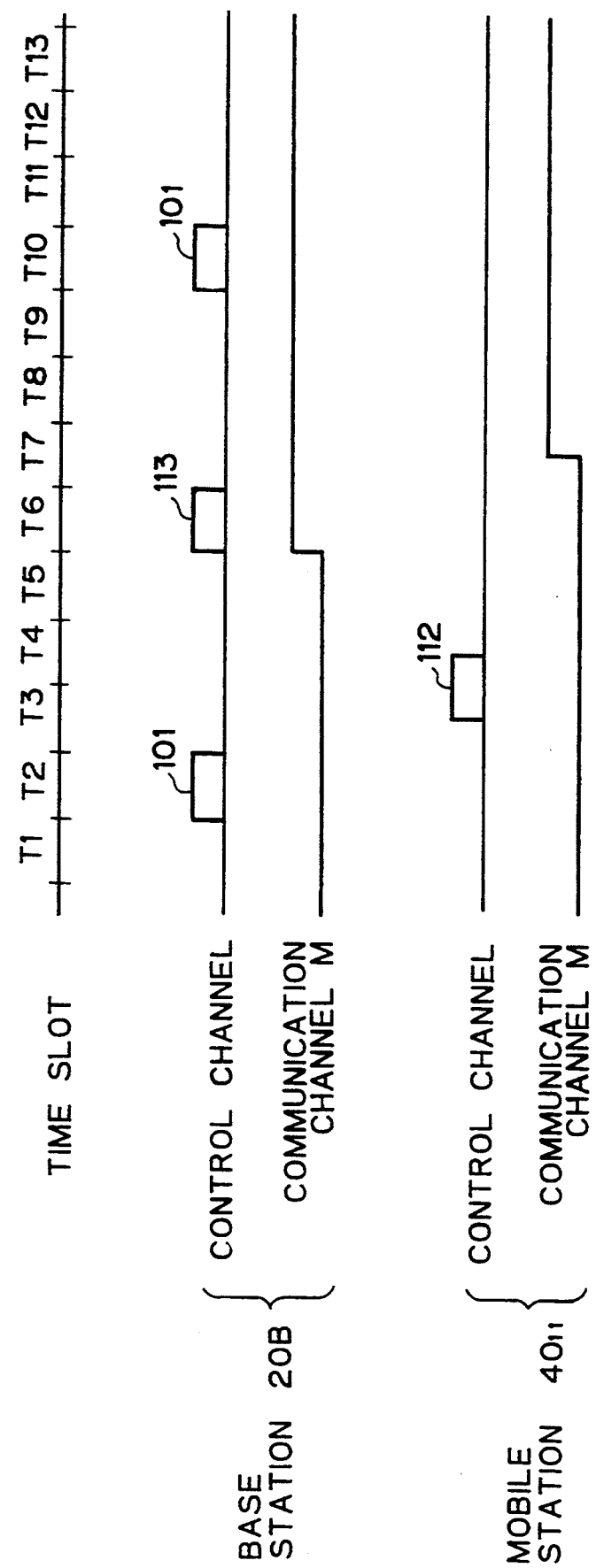
FIG. 6 is a timing chart for each signal when a mobile station calls.

An example of the operation in which mobile station $40_{11}$ is registered to base station 20B and passes from the control channel to the communication channel is described with reference to FIGS. 4 to 6. Transmitter/receiver 22 of the control channel at base station 20A sends an idle signal 101 in time slots T1 and T9 of the control channel, transmitter/receiver 22 of the control channel at base station 20B sends it in time slots T2 and T10, and transmitter/receiver 22 of the control channel at base station 20C sends it in time slots T4 and T12. Mobile station $40_{11}$ receives the idle signal 101 on the control channel transmitted from base stations 20A through 20C to send back a registration signal 102 (FIG. 5) to base station 20B synchronized with idle signal 101 of base station 20B from which mobile station $40_{11}$ receives the idle signal of the strongest radio field intensity. Upon receipt of registration signal 102, transmitter/receiver 22 of the control channel at base station 20B sends back a signal 103 in time slot T6 of the control channel to indicate the completion of registration of mobile station $40_{11}$. As a result, mobile station $40_{11}$ is registered to base station 20B. Next, mobile station $40_{11}$ transmits a call signal 112 (FIG. 6) to base station 20B synchronized with next idle signal 101 from base station 20B. Base station 20B that has received call signal 112 informs mobile station $40_{11}$ of the vacant communication channel M (M=1 through N) of all the base stations by an acknowledgement signal 113 while raising the communication channel M. Mobile station $40_{11}$ switches from the control channel to the communication channel M after receiving acknowledgement signal 113.

Figure 7:
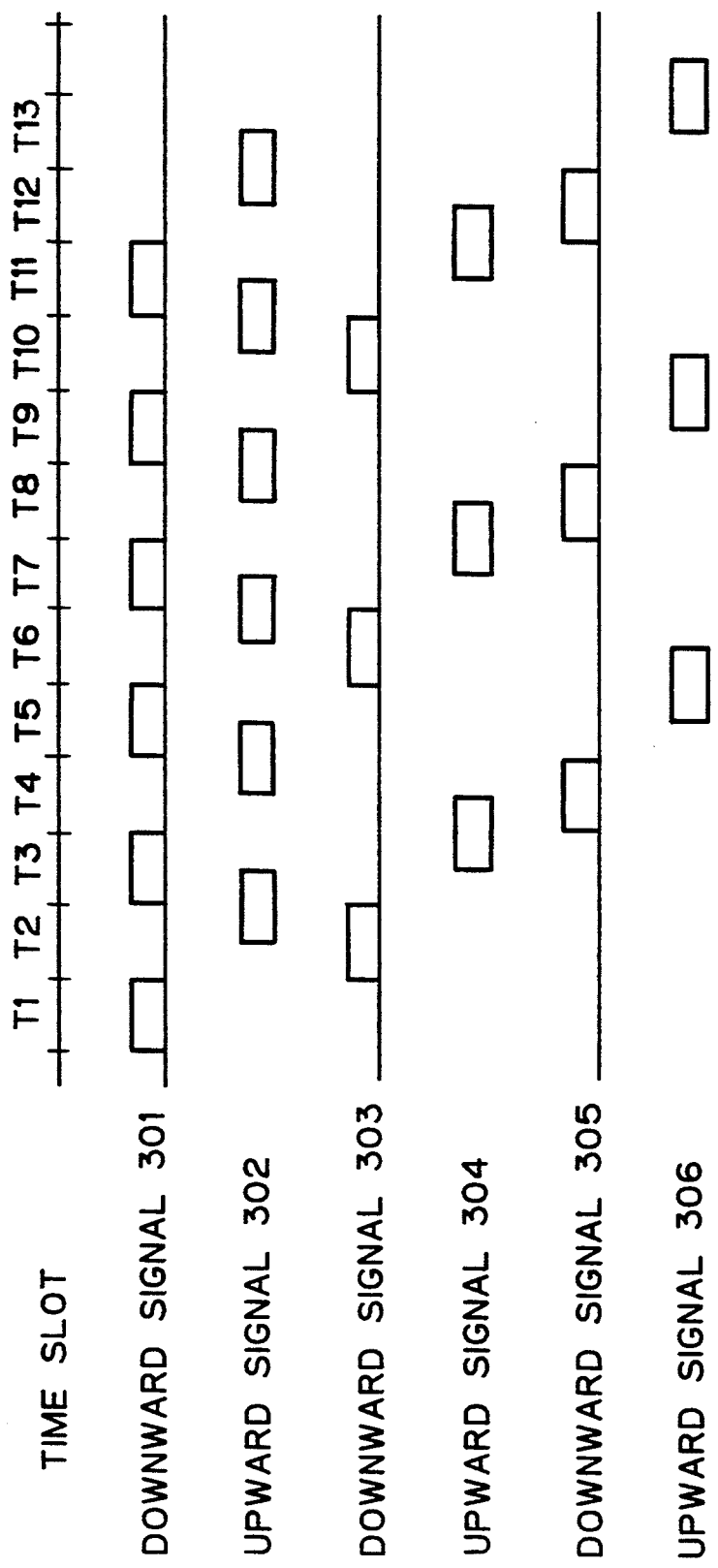
FIG. 7 is a view illustrating how a different time slot of the control channel is assigned to each of base stations 20A, 20B and 20C.

Let us assume that six mobile stations are registered to base station 20A, three mobile stations are registered to base station 20B, and three mobile stations are registered to base station 20C, all in the manner described above. Since more mobile stations are registered to base station 20A than to other base stations 20B and 20C, when calls are concentrated, more calls will be lost at base station 20A than at other base stations 20B and 20C. Therefore, control station 10 will alter the allocation of the time slots of the control channels to base stations 20A, as shown in FIG. 7. Six time slots T1, T3, T5, T7, T9, T11 are allocated to base station 20A in one frame while three time slots T2, T6 and T10 and T4, T8 and T12 are allocated to base stations 20B and 20C, respectively. As a result, the rate of call loss at base station 20A is reduced to the same low rate as at other base stations 20B and 20C.

In this manner, the number of time slots of the control channel allocated to each of base stations 20A, 20B and 20C is dynamically changed according in proportion to the number of the mobile stations registered to each base station.

While a preferred embodiment of the invention has here been described in specific terms, this description is for illustrative purposes only, and it is to be understood that changes and variations may be made without departing from the spirit or scope of the following claims.

What is claimed is:

1. A mobile communication system comprising a plurality of base stations to which a single control channel and a plurality of communication channels are allocated, a single control station interconnected to this plurality of base stations a plurality of mobile stations, each mobile station being disposed within an area of the plurality of base stations and allowed to communicate with a base station via the single control channel and the plurality of communication channels, means in each of said base stations for sequentially transmitting an idle signal to said mobile stations, said idle signal being allocated to a system time slot in said control channel, each of said mobile stations having means for selecting a base station whose idle signal exhibits the strongest radio field intensity based on the radio field intensity of the idle signal from each of said base stations, each of said mobile stations comprising means for transmitting a registration signal synchronized with the idle signal of the base station by said control channel, each of said base stations having means for sending back a signal indicating a completion of a registration into the assigned system time slot of said control channel based on said registration signal, each of said mobile stations having means for sending a call signal synchronized with the idle signal of said registered base station by said control channel, each of said base stations having means for assigning a vacant communication channel based on said call signal in order to send back an acknowledgement signal in the allocated system time slot of said control channel, said mobile station switching from said control channel to said assigned communication channel based on said acknowledgement signal, wherein said control channel and said plurality of communication channels are shared by said plurality of base stations.

2. Mobile communication system as set forth in claim 1 wherein said control station comprises means for determining a time slot of the control channel to be subsequently allocated to each base station in accordance with the ratio of the number of mobile stations registered to each base station at a given time.

3. A method of allocating time slots of a radio control channel to a plurality of base stations which may communicate with a plurality of mobile stations, respectively, over said time slots, comprising the steps of:
   (a) transmitting an idle signal from each of said base stations to the mobile stations in an allocated one of said time slots;
   (b) sending back a registration signal from a particular one of said mobile stations to a particular one of said base stations from which said particular mobile station receives an idle signal with the strongest field intensity;
   (c) upon receipt of said registration signal, registering said particular mobile station to said particular base station;
   (d) repeating said steps of (a) to (c) to register each of the remaining mobile stations to appropriate ones of said base stations; and
   (e) allocating said time slots to said base stations based on the number of mobile stations registered to each of said base stations.

* * * * *